Patented Dec. 28, 1937

2,103,558

UNITED STATES PATENT OFFICE 2,103,558

PHOSPHATES OF AMINO ACID ESTERS AND METHOD OF PRODUCING SAME

Walter Schoeller, Berlin-Westend, and Erich Borgwardt, Berlin-Hermsdorf, Germany, assignors to Schering-Kahlbaum A. G., Berlin, Germany, a corporation of Germany No Drawing. Application August 29, 1934, Serial No. 742,000. In Germany September 6, 1933

18 Claims. (Cl. 260—106)

This invention relates to derivatives of esters of amino acids, and more particularly to primary phosphates of esters of amino acids and a method for producing the same.

If esters of amino acids are reacted with strong mineral acids, saponification of said esters takes place even at ordinary temperature. Furthermore, said esters are transformed thereby into anhydride-like condensation products.

Now it has been found that on reacting equimolecular proportions of ortho-phosphoric acid with esters of amino acids or their derivatives, such as the esters of sarcosine, tyrosine, tryptophane, creatine, and the like, the primary phosphates of the esters are obtained in quantitative yield. The reaction is preferably carried out in the presence of solvents, such as methanol or ethanol or the like, whereby the phosphates are immediately precipitated in the form of well crystallized compounds, generally readily soluble in water.

The compounds of the present invention may be represented by the following general formula:

(NX₂R'COOR) H₃PO₄ wherein X is hydrogen or a substituent element or group and R and R' represent alkyl, aryl, aralkyl or alicyclic radicals.

When esters of glycocol are reacted with phosphoric acid, the products may be represented by the following general formula:

(NH₂CH₂COOR) H₃PO₄ wherein R represents an alkyl, aryl, aralkyl or alicyclic radical.

When esters of sarcosine are reacted with phosphoric acid, the products may be represented by the following general formula:

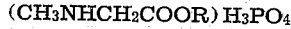

(CH₃NHCH₂COOR) H₃PO₄ wherein R represents an alkyl, aryl, aralkyl or alicyclic radical.

It is of advantage to keep the reaction temperature as low as possible, preferably at 5° C., although it is possible, under suitable conditions, to cause the reaction to take place at room temperature or even at a higher temperature.

The primary phosphates of esters of amino acids and their derivatives which can be obtained very readily by this method are very effective roborants, tonics, and the like. In comparison with the hitherto used roborants, such as the alkali metal salts of phosphoric acid, these compounds have the advantage that on application of the same the organism is not flooded with alkali; on the contrary amino acids are formed on decomposition, said amino acids favorably influencing the building up of the muscle tissue.

The following examples serve to illustrate the invention without, however, limiting the same to them.

Example I 1 part of ortho-phosphoric acid is dissolved in ice-cold ethyl alcohol, this solution is added slowly and gradually, while cooling and stirring, to an ice-cold ethyl alcohol solution of 1 part of the ester of glycocol. Thereby the phosphate crystallizes in colorless laminae. It is filtered off by suction, washed with alcohol, and dried. The dry product is very readily soluble in water and melts at 134–135° C.

Example II 12 parts of ortho-phosphoric acid are dissolved in ether, this solution is added, while cooling, to an ethereal solution of 12 parts of the methyl ester of sarcosine. The precipitated phosphate is sucked off, washed with ether, and dried. The primary phosphate of the methyl ester of sarcosine obtained thereby is a colorless crystalline powder which is readily soluble in water and less soluble in alcohol.

Example III 1 part of ortho-phosphoric acid is dissolved in ten times its amount of methyl alcohol. This solution is added, while stirring vigorously, into a solution of 1 part of the ester of glycocol in 20 parts of methyl alcohol, which has been heated to about 40° C. The precipitated phosphate is filtered off by suction and washed with alcohol.

Example IV 9.8 parts of ortho-phosphoric acid are triturated with 10.3 parts of the ethyl ester of glycocol in a well cooled dish, until the mass solidifies to a solid cake. The latter is several times stirred up with alcohol, the phosphate obtained is filtered with suction and dried.

Other esters of amino acids and their derivatives as the above mentioned may be used as starting material and many other variations and changes may be made by those skilled in the art in accordance with the principles set forth herein and in the claims annexed hereto.

What we claim is:

1. Addition products of aliphatic esters of amino acids and phosphoric acid.

2. Addition products of aliphatic esters of amino acids and phosphoric acid in equimolecular proportions.

3. Primary phosphates of amino acid esters having the following general formula:

$$(NX_2R'COOR)H_3PO_4$$

wherein X represents a radical taken from the class consisting of hydrogen, alkyl, amino-alkyl and imino-alkyl, R is an alkyl radical, and R' represents a radical taken from the class consisting of alkyl, aralkyl and heterocyclic-alkyl.

4. Primary phosphates of glycocol esters having the following general formula:

$$(NH_2CH_2COOR)H_3PO_4$$

wherein R represents an alkyl radical.

5. Primary phosphates of sarcosine esters having the following general formula:

$$(CH_3NH_2CH_2COOR)H_3PO_4$$

wherein R represents an alkyl radical.

6. A method for the production of primary phosphates of amino acid esters which comprises mixing substantially equimolecular proportions of phosphoric acid and an aliphatic ester of an amino acid.

7. A method for the production of primary phosphates of amino acid esters which comprises mixing substantially equimolecular proportions of phosphoric acid and an aliphatic ester of an amino acid and isolating the reaction product.

8. A method for the production of primary phosphates of amino acid esters which comprises mixing substantially equimolecular proportions of phosphoric acid and an aliphatic ester of an amino acid in the presence of a solvent.

9. A method for the production of primary phosphates of amino acid esters which comprises mixing substantially equimolecular proportions of phosphoric acid and an aliphatic ester of an amino acid and cooling the reaction mass.

10. A method for the production of primary phosphates of amino acid esters which comprises dissolving phosphoric acid in an organic solvent, adding the same gradually to a solution of an aliphatic ester of an amino acid, and separating the precipitated reaction product.

11. A method for the production of primary phosphates of amino acid esters which comprises dissolving phosphoric acid in an organic solvent, adding the same gradually to a solution of an aliphatic ester of an amino acid, cooling the solution, and separating the precipitated reaction product.

12. A method for the production of primary phosphates of amino acid esters which comprises dissolving phosphoric acid in an organic solvent, adding the same gradually to a solution of an equimolecular amount of an aliphatic ester of an amino acid, and separating the precipitated reaction product.

13. A method for the production of primary phosphates of amino acid esters which comprises triturating phosphoric acid with an aliphatic ester of an amino acid, and separating the reaction product.

14. A method for the production of primary phosphates of amino acid esters which comprises triturating phosphoric acid with an aliphatic ester of an amino acid, cooling the reaction mass, and separating the reaction product.

15. A method for the production of primary phosphates of amino acid esters which comprises triturating phosphoric acid with an equimolecular amount of an aliphatic ester of an amino acid, and separating the reaction product.

16. Addition products of the lower aliphatic esters of amino acids and phosphoric acid.

17. Addition products of the lower aliphatic esters of amino acids and phosphoric acid in equimolecular proportions.

18. Addition products of phosphoric acid and a compound taken from the class consisting of esters of glycocol, sarcosine, tyrosine, tryptophane, creatine.

WALTER SCHOELLER.
ERICH BORGWARDT.